United States Patent
Kumar et al.

(10) Patent No.: US 10,699,371 B2
(45) Date of Patent: Jun. 30, 2020

(54) SYSTEMS AND METHODS FOR REDUCING PARALLAX IN AIRCRAFT DISPLAYS

(71) Applicant: Rockwell Collins, Inc., Cedar Rapids, IA (US)

(72) Inventors: Sheetal Kumar, Tehsil Dharamshala (IN); Shibarchi Majumder, Bolpur (IN)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 16/042,890

(22) Filed: Jul. 23, 2018

(65) Prior Publication Data

US 2019/0057486 A1 Feb. 21, 2019

(30) Foreign Application Priority Data

Aug. 18, 2017 (IN) .............................. 201711029308

(51) Int. Cl.
| | |
|---|---|
| *G06T 3/00* | (2006.01) |
| *G06F 3/0484* | (2013.01) |
| *G06F 3/01* | (2006.01) |
| *G06F 3/0488* | (2013.01) |
| *B64D 43/00* | (2006.01) |
| *G08G 5/00* | (2006.01) |

(52) U.S. Cl.
CPC ............ *G06T 3/0006* (2013.01); *B64D 43/00* (2013.01); *G06F 3/011* (2013.01); *G06F 3/013* (2013.01); *G06F 3/017* (2013.01); *G06F 3/0488* (2013.01); *G06F 3/04845* (2013.01); *G08G 5/0021* (2013.01)

(58) Field of Classification Search
CPC ....... G06T 3/0006; G06F 3/013; G06F 3/017; G06F 3/04845; G06F 3/0488
See application file for complete search history.

(56) References Cited

U.S. PATENT DOCUMENTS

| | | | |
|---|---|---|---|
| 8,487,786 B1* | 7/2013 | Hussey | G08G 5/0021 340/955 |
| 2008/0133122 A1* | 6/2008 | Mashitani | G01C 21/36 701/456 |
| 2012/0036433 A1* | 2/2012 | Zimmer | G06T 15/20 715/702 |
| 2013/0047112 A1* | 2/2013 | Waller | B60H 1/00985 715/771 |

(Continued)

*Primary Examiner* — Yu Chen
(74) *Attorney, Agent, or Firm* — Donna P. Suchy (57) ABSTRACT

A system for an airborne platform includes a display device, an input device, and an image processing circuit. The display device is configured to display a visualization provided as a pixel matrix capable of being virtually rotated along a horizontal axis or along a vertical axis based on a user input. The input device is configured to receive user input providing an indication to virtually rotate the visualization along at least one of the horizontal axis and the vertical axis. The image processing circuit is configured to receive pixel data corresponding to the pixel matrix, receive the user input from the input device, determine an offset angle to virtually rotate the visualization along the horizontal axis or the vertical axis, configure the visualization in response to the determined offset angle, and output the configured visualization for display on the display device.

20 Claims, 7 Drawing Sheets

(56) References Cited

U.S. PATENT DOCUMENTS

| | | | |
|---|---|---|---|
| 2014/0267178 A1* | 9/2014 | Bathiche | G06F 3/0488 345/178 |
| 2015/0138163 A1* | 5/2015 | Baldwin | G06F 3/0488 345/178 |
| 2017/0017378 A1* | 1/2017 | Wild | B60K 37/06 |
| 2018/0329492 A1* | 11/2018 | Coppin | G06F 3/015 |

* cited by examiner

SYSTEMS AND METHODS FOR REDUCING PARALLAX IN AIRCRAFT DISPLAYS

CROSS-REFERENCE TO RELATED PATENT APPLICATIONS

The present application claims the benefit of and priority to Indian Application Serial No. 201711029308, filed on Aug. 18, 2017, entitled "SYSTEMS AND METHODS FOR REDUCING PARALLAX IN AIRCRAFT DISPLAYS" by Kumar et al., which is incorporated herein by reference in its entirety.

BACKGROUND

The inventive concepts disclosed herein relate generally to the field of aircraft flight display systems. More particularly, embodiments of the inventive concepts disclosed herein relate to systems and methods for reducing parallax in a display of an airborne platform.

A cockpit of an aircraft may include a control center with a set of displays. The displays can provide helpful information to an operator of the aircraft, such as a pilot, for navigating and controlling the aircraft. Sophisticated aircrafts may include several displays spread horizontally and vertically across the control center.

Some displays are not placed directly in front of the pilot's line of sight. For example, when the pilot is seated in the cockpit, a display can be vertically placed several feet below the pilot's head or eyes. This may cause the pilot to look downwards when viewing the display. Similarly, the same display or another display can be horizontally placed several feet to the right of the pilot, causing the pilot to look towards the right when viewing the display. The vertical or horizontal position of the display relative to the pilot can cause the pilot to experience parallax error and strain when viewing the display.

SUMMARY

In one aspect, the inventive concepts disclosed herein are directed to a system for an airborne platform. The system includes a display device, an input device, and an image processing circuit communicably coupled to the display device. The display device is configured to display a visualization provided as a pixel matrix capable of being virtually rotated along a horizontal axis or along a vertical axis based on a user input. The input device is configured to receive the user input from a user, the user input providing an indication to virtually rotate the visualization along at least one of the horizontal axis and the vertical axis. The image processing circuit is further configured to receive pixel data corresponding to the pixel matrix, receive the user input from the input device, determine an offset angle to virtually rotate the visualization along at least one of the horizontal axis and the vertical axis in response to the received user input, configure the visualization in response to the determined offset angle, and output the configured visualization for display on the display device.

In a further aspect, the inventive concepts disclosed herein are directed to an image processing circuit communicably coupled to a display device of an airborne platform configured to display a visualization provided as a pixel matrix capable of being virtually rotated along a horizontal axis or along a vertical axis based on a user input. The image processing circuit is configured to receive pixel data corresponding to the pixel matrix. The image processing circuit is further configured to receive the user input from the input device, the user input providing an indication to virtually rotate the visualization along at least one of the horizontal axis and the vertical axis. The image processing circuit is further configured to determine an offset angle to virtually rotate the visualization along at least one of the horizontal axis and the vertical axis in response to the received user input. The image processing circuit is further configured to configure the visualization in response to the determined offset angle. The image processing circuit is further configured to output the configured visualization for display on the display device.

In a further aspect, the inventive concepts disclosed herein are directed to a method for virtually rotating a visualization displayed on a display device of an airborne platform, the visualization provided as a pixel matrix capable of being virtually rotated along a horizontal axis or along a vertical axis based on a user input. The method includes receiving, by an image processing circuit, pixel data corresponding to the pixel matrix. The method further includes receiving, by the image processing circuit, the user input from an input device, the user input providing an indication to virtually rotate the visualization along at least one of the horizontal axis and the vertical axis. The method further includes determining, by the image processing circuit, an offset angle to virtually rotate the visualization along at least one of the horizontal axis and the vertical axis in response to the received user input. The method further includes configuring, by the image processing circuit, the visualization in response to the determined offset angle. The method further includes outputting, by the image processing circuit, the configured visualization for display on the display device.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Broadly, embodiments of the inventive concepts disclosed herein are directed to systems and methods for reducing parallax in a display of an airborne platform (e.g., an aircraft). The inventive concepts disclosed herein can be utilized in a number of display devices and systems for airborne platforms including but not limited to flight control and autopilot systems, navigation systems, and flight display systems. While the present disclosure describes systems and methods implementable for an airborne platform, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system).

In some embodiments, a system includes an airborne platform, a display device provided in the airborne platform, an input device, and an image processing circuit configured to output a visualization on the display device. The visualization is provided as a pixel matrix on a display screen of the display device. The image processing circuit is configured to virtually rotate the visualization along an x-axis and/or a y-axis by modifying or manipulating a plurality of pixels in the pixel matrix.

The image processing circuit can be configured to virtually rotate the visualization in response to user input from the input device. For example, a pilot or operator may desire to virtually rotate the visualization such that a plane formed by the pixel matrix appears to face the pilot. The pilot can interact with the input device to provide an indication of an offset angle in which the visualization is virtually rotated along the x-axis and/or the y-axis. The image processing circuit can process the received indication and virtually rotate the visualization by modifying or manipulating the displayed pixel matrix. By virtually rotating the visualization displayed on the display screen, the image process circuit simulates actual rotation of the display screen and/or display device to reduce the effects of parallax error.

Figure 1:
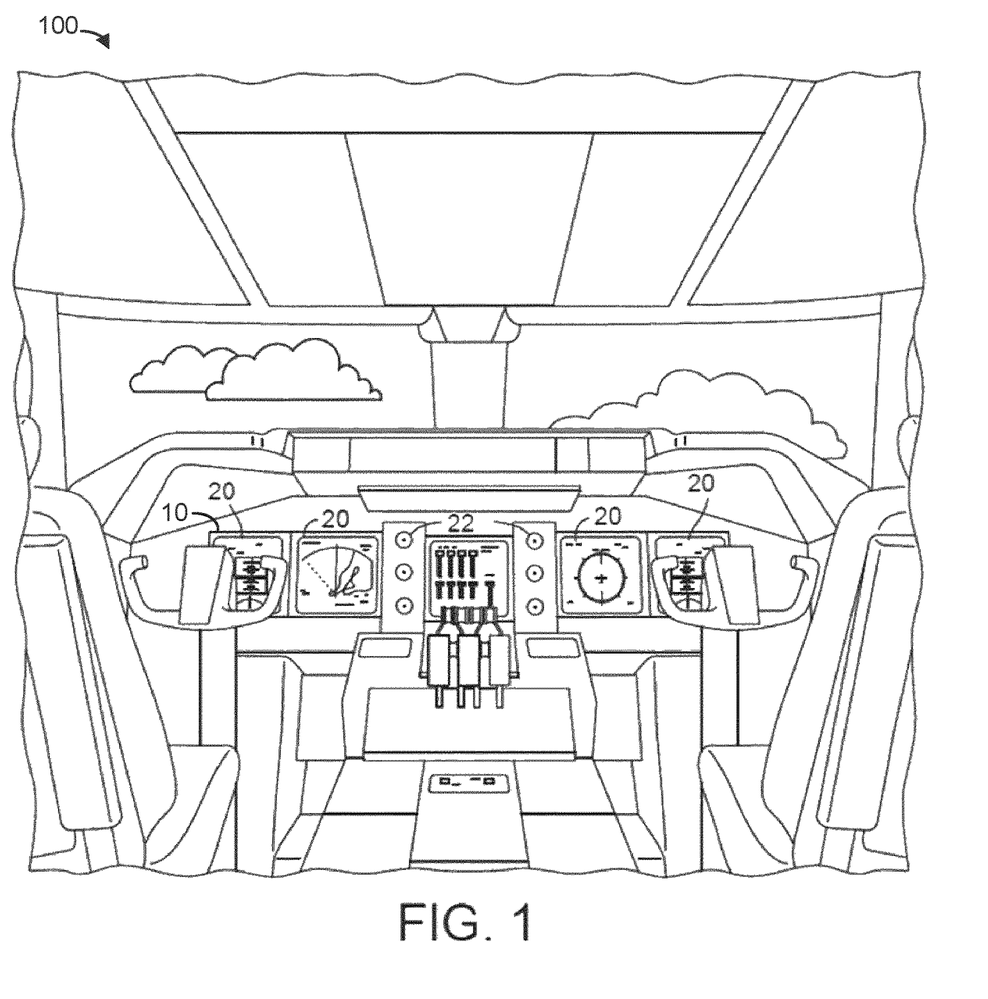
FIG. 1 is a schematic illustration of an exemplary embodiment of an aircraft cockpit according to the inventive concepts disclosed herein.

Referring to FIG. 1, a perspective view schematic illustration of an aircraft cockpit 100 is shown according to an exemplary embodiment of the inventive concepts disclosed herein. The aircraft cockpit 100 can be configured for a pilot or operator to interact with avionics systems of an airborne platform. The aircraft cockpit 100 is shown to include a control center 10 having one or more flight displays 20 and one or more user interface ("UP") elements 22. The flight displays 20 can be horizontally or vertically placed at various locations across the control center 10.

The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to provide a rendered display from the systems and methods of the inventive concepts disclosed herein.

In some embodiments, the flight displays 20 may provide an output based on data received from a system external to an aircraft, such as a ground-based weather radar system, satellite-based system, a sensor system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three-dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft. The flight displays 20 may receive image information, such as a visualization including one or more flight path indicators, and display the visualization to help an aircraft crew member to control the aircraft, such as to follow the flight path to an end location such as a landing location (e.g., to a runway).

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust a rotation of a visualization displayed on the flight display 20, as described below in further detail.

Still referring to FIG. 1, one or more flight displays 20 within the control center 10 may be vertically displaced and/or horizontally displaced relative to the operator. For example, when the operator is seated in cockpit 100, the operator may need to look downwards to view one of the flight displays 20 because the flight display 20 is vertically displaced relative to the operator's eyes. Similarly, when the operator is seated in the left seat of cockpit 100, the operator may need to look rightwards to view a flight display 20 placed in the middle of the control center 10 because the flight display 20 is horizontally displaced relative to the operator's eyes. Each of the flight displays 20 of the cockpit 100 may be vertically displaced, horizontally displaced or both.

Each of the flight displays 20 has a display screen generally configured to display a visual output, such as a pixel matrix having rows and columns. Each display screen is generally positioned to face internal spaces of the cockpit 100. However, one or more display screens may not be positioned to directly face an operator. Accordingly, an operator may experience parallax if a flight display 20 is horizontally and/or vertically displaced relative to the operator, and if a display screen of the flight display 20 is not positioned to directly face the operator.

Figure 2:
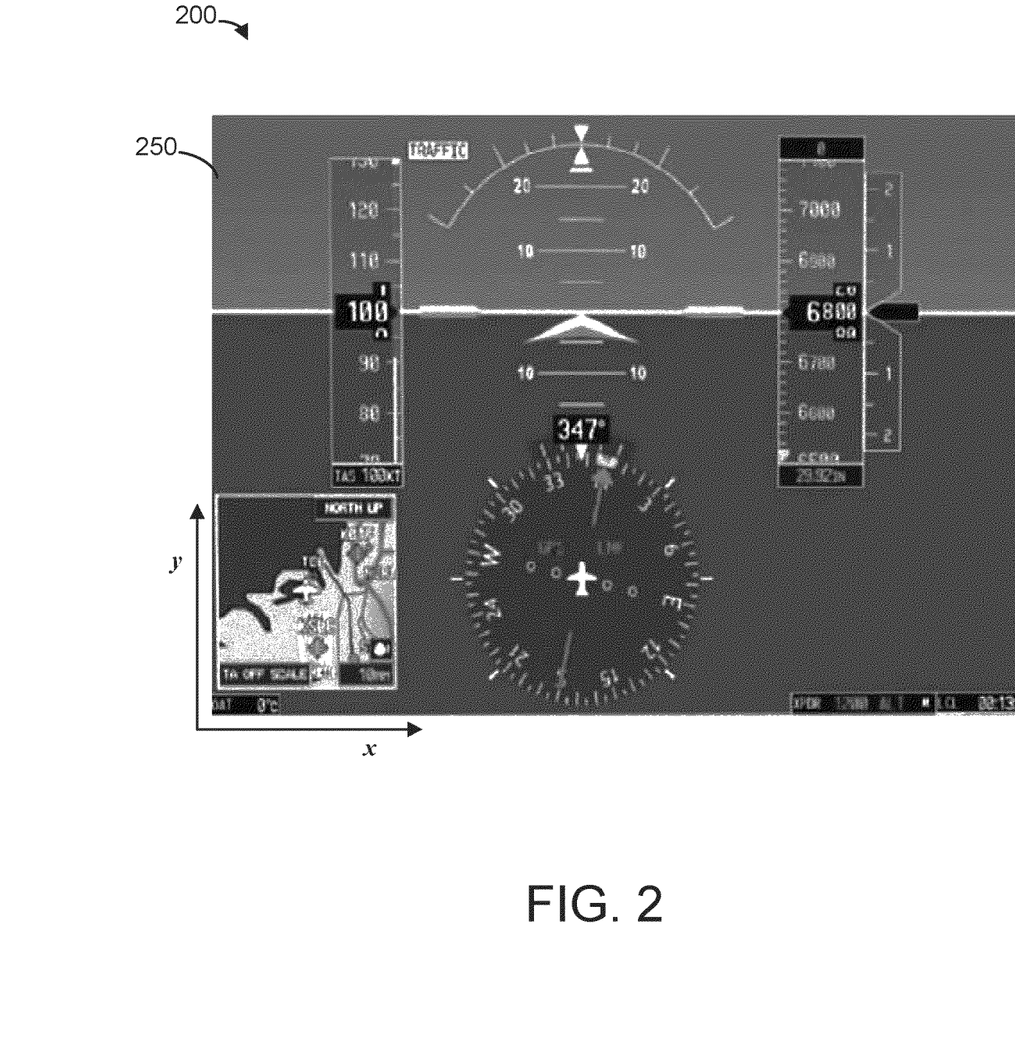
FIG. 2 is an example screenshot illustrating a visualization displayed on an aircraft display screen, according to the inventive concepts disclosed herein.

Referring to FIG. 2, an example screenshot 200 shows a visualization 250 with various flight information and graphical representation according to the inventive concepts disclosed herein. Although the visualization 250 is shown to include one combination of flight information and graphical representations, the visualization 250 can include any variety of text, pictures, or other information as described above.

In some embodiments, the visualization 250 can be displayed by a display screen of a flight display 20. The visualization 250 can be provided for display as a plane corresponding to a pixel matrix with rows and columns. Each pixel in the pixel matrix can have a value corresponding to a color. The visualization 250 can be virtually rotated about the y-axis and/or the x-axis for display on the display screen. A plurality of pixel values in the pixel matrix can be modified or manipulated to virtually rotate the visualization 250.

When the flight display 20 is horizontally or vertically displaced relative to the operator and when a display screen of the flight display 20 does not face the operator, it may be desirable to virtually rotate the visualization to simulate actual rotation of the display screen and/or the flight display 20. The operator can interact with UI elements 22 to provide an indication to virtually rotate the visualization at an offset angle corresponding to the x-axis and/or the y-axis.

Figure 3:
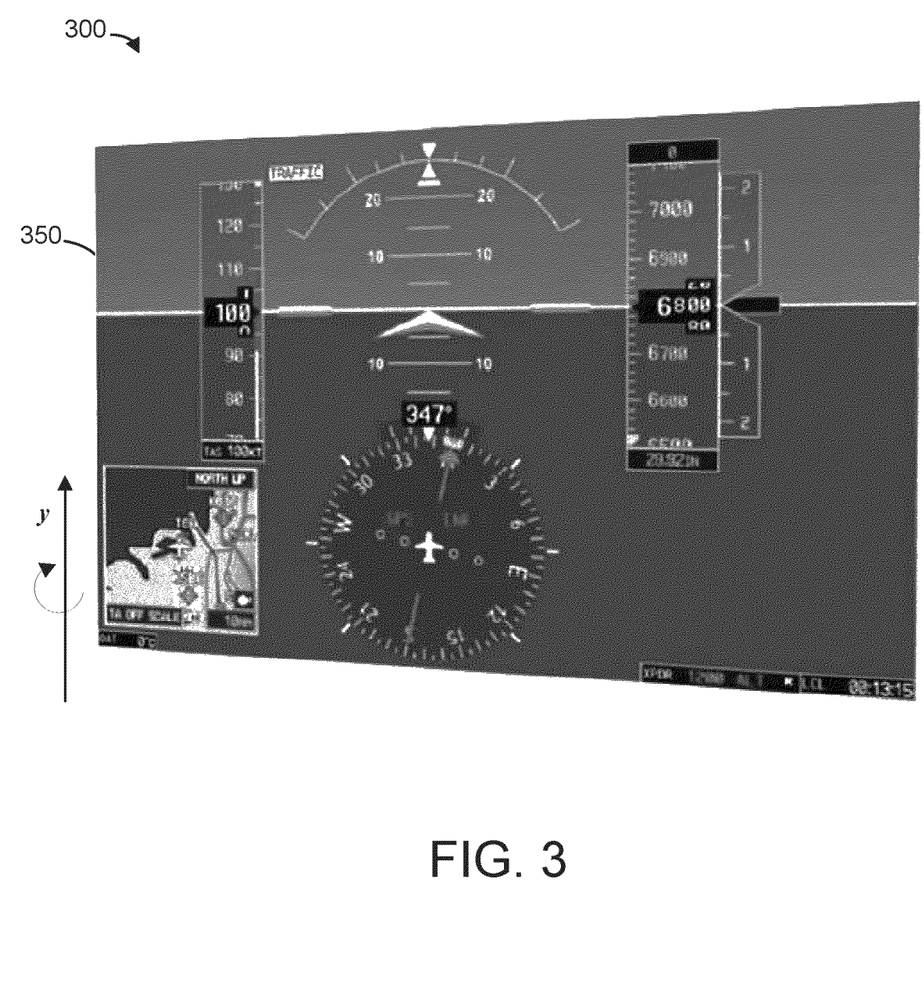
FIG. 3 is an example screenshot illustrating a rotated visualization displayed on an aircraft display screen, according to the inventive concepts disclosed herein.
Figure 4:
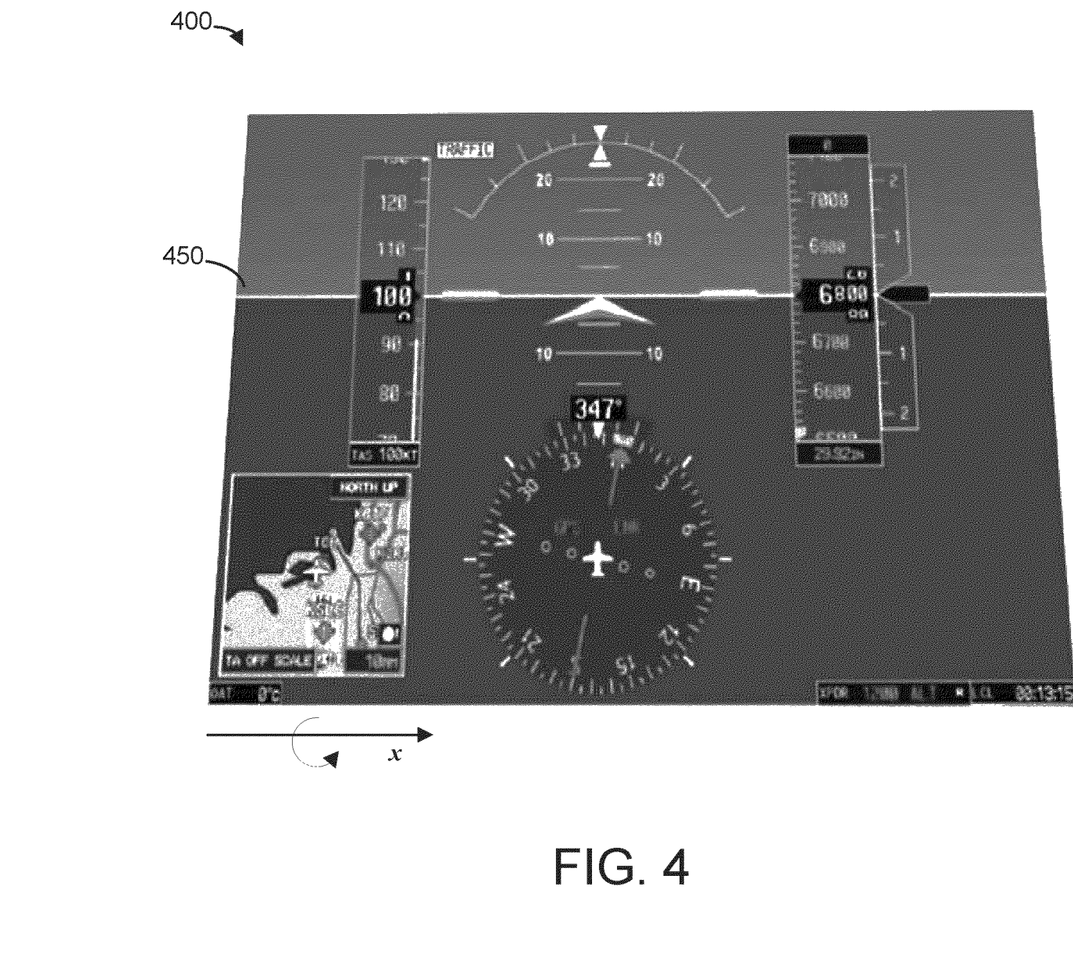
FIG. 4 is another example screenshot illustrating a rotated visualization displayed on an aircraft display screen, according to the inventive concepts disclosed herein.
Figure 5:
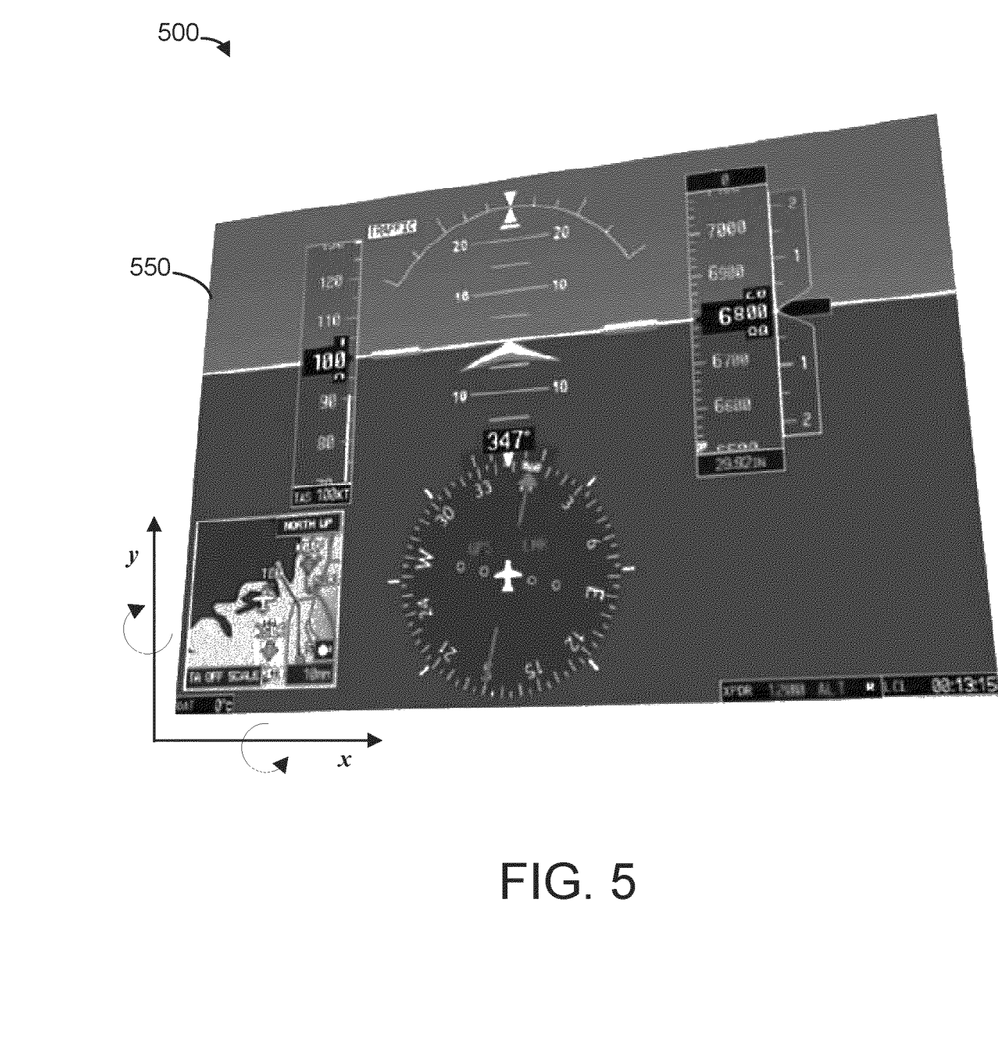
FIG. 5 is another example screenshot illustrating a rotated visualization displayed on an aircraft display screen, according to the inventive concepts disclosed herein.

Referring to FIGS. 3-5, various example screenshots displaying rotated visualizations are shown according to the inventive concepts disclosed herein. Referring to FIG. 3, an example screenshot 300 includes a rotated visualization 350. The rotated visualization 350 corresponds to the visualization 250 virtually rotated about the y-axis. The rotated visualization 350 can be displayed by a display screen of a flight display 20 as a pixel matrix with rows and columns. In some embodiments, a plurality of pixels in the pixel matrix corresponding to the visualization 250 are modified or manipulated to generate the rotated visualization 350.

Referring to FIG. 4, an example screenshot 400 includes a rotated visualization 450. The rotated visualization 450 corresponds to the visualization 250 virtually rotated about the x-axis. The rotated visualization 450 can be displayed by a display screen of a flight display 20 as a pixel matrix with rows and columns. In some embodiments, a plurality of pixels in the pixel matrix corresponding to the visualization 250 are modified or manipulated to generate the rotated visualization 450.

In some embodiments, the flight display 20 is both vertically displaced and horizontally displaced relative to the operator. In this regard, it may be desirable to the operator to virtually rotate the visualization 250 about both the x-axis and the y-axis. FIG. 5 shows an example screenshot 500 of a rotated visualization 550. The rotated visualization 550 corresponds to the visualization 250 virtually rotated about both the x-axis and the y-axis. The rotated visualization 550 can be displayed by a display screen of the flight display 20 as a pixel matrix with rows and columns. In some embodiments, a plurality of pixels in the pixel matrix corresponding to the visualization 250 are modified or manipulated to generate the rotated visualization 550.

Figure 6:
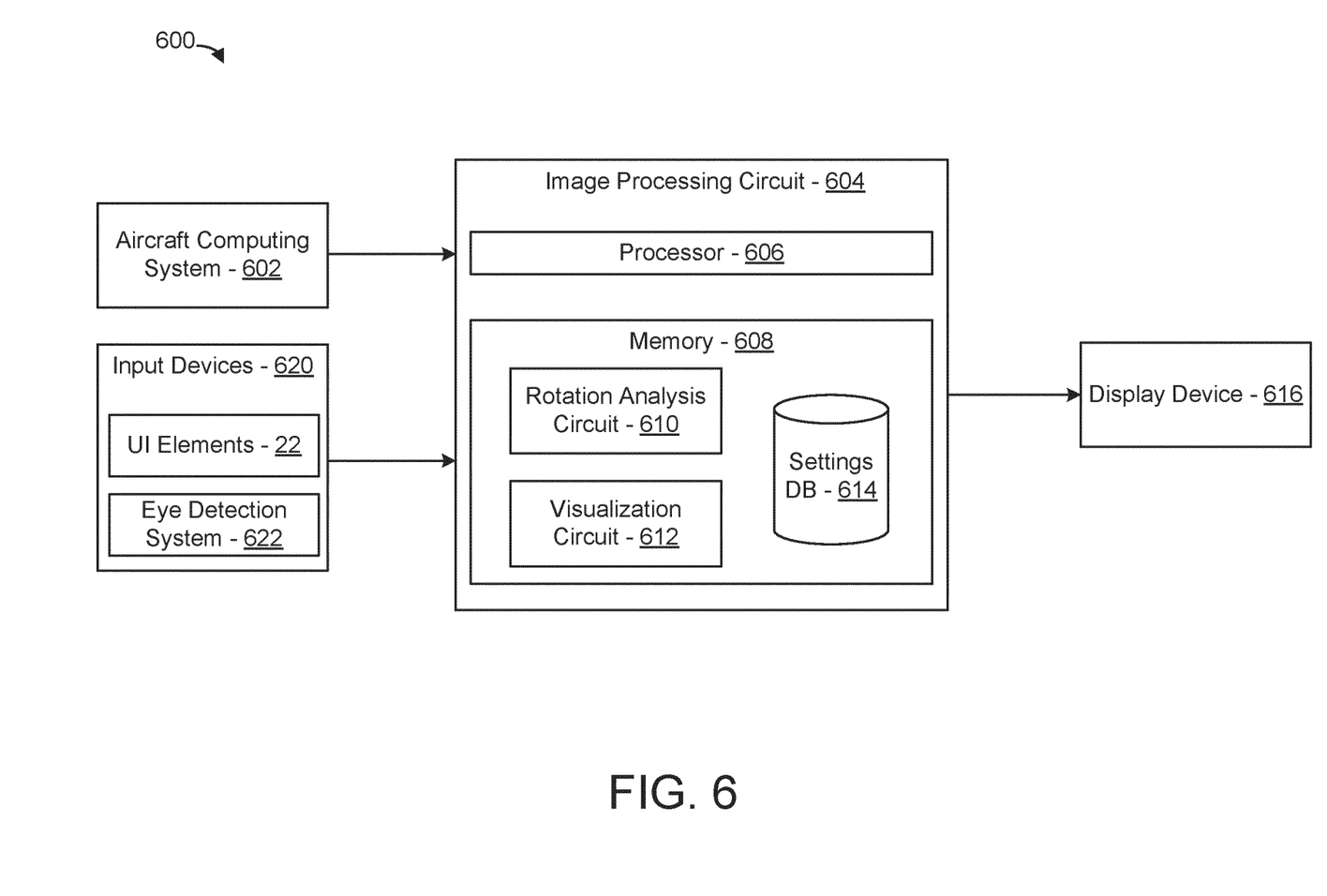
FIG. 6 is a block diagram of an exemplary embodiment of a system configured to generate a rotated visualization for display on an aircraft display screen, according to the inventive concepts disclosed herein.

Referring now to FIG. 6, a display system 600 configured to generate a rotated visualization for display on an aircraft display screen is illustrated in accordance with the inventive concepts described herein. The display system 600 can be included in an airborne platform, such as by being included in or as part of aircraft cockpit 100. The display system 600 can include or be components of the aircraft cockpit 100, including the control center 10, the flight displays 20, and the UI elements 22.

The display system 600 is shown to include an image processing circuit 604 and an aircraft computing system 602, and a display device 616. The image processing circuit 604 is generally configured to virtually rotate a visualization (e.g. the visualization 250) for display on a display screen. The visualization can relate to a two-dimensional plane represented as a pixel matrix with rows and columns. In some embodiments, the image processing circuit 604 can be configured to receive pixel data relating to the pixel matrix from the aircraft computing system 602.

In some embodiments, the image processing circuit 604 is configured to determine an offset angle to virtually rotate a visualization (e.g., the visualization 250) along an x-axis and/or along a y-axis. The image processing circuit 604 can be configured to determine the offset angle in response to input information received from input devices 620. The image processing circuit 604 can be configured to generate a rotated matrix according to the determined offset angle by modifying a plurality of pixels in the pixel matrix to generate a rotated visualization. For example, the image processing circuit 604 can be configured to modify a pixel color value for each of the plurality of pixels. The image processing circuit 604 can be configured to output the rotated visualization on a display screen of the display device 616, for example as shown with reference to FIGS. 3-5.

The display device 616 can be generally configured to display a visualization represented as a pixel matrix. In some embodiments, the display device 616 is communicably coupled to the image processing circuit 604. The display device 616 can be similar to the flight display 20 described above with reference to FIG. 1. In some embodiments, the display device 616 is vertically and/or horizontally placed along the control center 10 of the cockpit 100. In some embodiments, the display device 616 has a display screen that is generally positioned to face internal spaces of the cockpit 100. An operator may experience parallax when the display screen does not face the operator.

The display system 600 is shown to further include one or more input devices 620. The input devices 620 are generally configured to receive a user input from an operator relating to an adjustment of a visualization displayed on the display device 616. In some embodiments, the user input relates to an indication of rotating a visualization about an axis at an offset angle value. The input devices are generally configured to provide the image processing circuit 604 with input information relating to the indication.

The input devices 620 are communicably coupled to the image processing circuit 604. In some embodiments, the input devices 620 are communicably coupled to the image processing circuit 604 by a wired connection (e.g., via an electronic data bus of the airborne platform). In some embodiments, the input devices 620 are communicably coupled to the image processing circuit 604 by a wireless connection (e.g., the display system 600 can include wireless receiver hardware for communicating with wireless transmission hardware provided with the input devices 620). In some embodiments, system 600 includes both wired and wireless connections.

The input devices 620 are shown to include the UI elements 22 and an eye detection system 622. Embodiments can include any combination of the UI elements 22, the eye detection system 622, and any other device configured to receive user input. The input devices 620 can be configured to transmit input information relating to the received user input to the image processing circuit 604.

In some embodiments, the input devices 620 includes a plurality of UI elements 22 as described above with reference to FIG. 1. For example, the UI elements 22 may include two dials configured to receive a user input relating to a desired adjustment of the visualization. A first dial can be associated with virtually rotating the visualization along a y-axis, and the second dial can be associated with virtually rotating the visualization along the x-axis. In another example embodiment, the UI elements 22 can include a touch screen device configured to receive touch gestures relating to a desired adjustment of the visualization. The touch screen device can be integrated with the display device 616 (e.g., the display device 616 is or includes a touchscreen). Embodiments can include any suitable combination of the UI elements 22.

In some embodiments, the input devices 620 includes an eye detection system 622. The eye detection system 622 can be configured to detect a horizontal displacement component value, vertical displacement component value, and/or a distance value of the display device 616 relative to the operator. The horizontal displacement component value can correspond to a horizontal position of the display relative to the operator. The vertical displacement component value can correspond to a vertical position of the display relative to the operator. The distance value of the display device 616 can correspond to a distance between the operator and the display device 616 and/or the control center 10. In some embodiments, the input devices 620 are configured to automatically detect the horizontal displacement component value, vertical displacement component value, and/or a distance value.

In some embodiments, the eye detection system 622 can include one or more cameras for detecting the horizontal displacement component value, the vertical displacement component value, and/or the distance value. For example, a camera can be configured to receive an image of the operator's head by placing the camera proximate to the control center 10 and positioning the camera such that its lens is pointed towards the headrest of a seat. The camera of the eye detection system 622 can be configured to continuously or intermittently receive images or frames that capture at least a portion of the operator's body. In some embodiments, the camera is also configured to capture surrounding areas of the cockpit 100 to facilitate eye detection. The eye detection system 622 can be configured to transmit the received images or frames to image processing circuit 604.

The eye detection system 622 can be any suitable type and/or configuration for detecting the horizontal displacement component value, the vertical displacement component value, and/or the distance value. For example, in some embodiments, the eye detection system 622 can include a light source configured to create infrared or near-infrared light and an optical sensor configured to receive corneal reflections for eye detection. In another example embodiment, the eye detection system 622 can include a wearable device (e.g., eyeglasses or a head-mounted device) and one or more sensors proximate to the display device 616. In another example embodiment, the eye detection system 622 can include a thermal camera configured to detect the position (e.g., a vertical displacement component value) of the operator's head.

In some embodiments, the input devices 620 can include any device in addition to or alternate to the UI elements 22 and the eye detection system 622. In some embodiments, the input devices 620 includes one or more sensor devices configured to automatically detect or estimate the position of the operator's eyes or head. For example, the input devices 620 can include a sensor device configured in a seat of the cockpit 100 and/or another sensor device proximate to the display device 616. The sensors can be configured to detect or estimate a horizontal displacement component of the display device 616 relative to the operator seat. Embodiments can include any suitable sensor device, such as ultrasonic, photoelectric, laser range-finder, etc.

Referring to FIG. 6 in further detail, the image processing circuit 604 is shown to include a processor 606 and a memory 608. The processor 606 may be implemented as a specific purpose processor, an application specific integrated circuit (ASIC), one or more field programmable gate arrays (FPGAs), a group of processing components, or other suitable electronic processing components. The memory 608 is one or more devices (e.g., RAM, ROM, flash memory, hard disk storage) for storing data and computer code for completing and facilitating the various user or client processes, layers, and modules described in the present disclosure. The memory 608 may be or include volatile memory or non-volatile memory and may include database components, object code components, script components, or any other type of information structure for supporting the various activities and information structures of the inventive concepts disclosed herein. The memory 608 is communicably connected to the processor 606 and includes computer code or instruction modules for executing one or more processes described herein. The memory 608 can include various circuits, software engines, and/or modules that cause the processor 606 to execute the systems and methods described herein.

While FIG. 6 shows the image processing circuit 604 to include a single processor, in various embodiments, the image processing circuit 604 can include various numbers or arrangements of processors. For example, the processor 606 can be a multi-core processor. The processor 606 can include a plurality of processors that may be dedicated to different tasks. The image processing circuit 604 can include the processor 606 as well as a graphics processing unit (GPU) (not shown); the GPU may be configured to retrieve (or be controlled by the processor 606 to retrieve) electronic instructions for generating a visualization and execute the electronic instructions in order to generate a visualization for display by the display device 616.

Memory is shown to include a rotation analysis circuit 610. In some embodiments, the rotation analysis circuit 610 is configured to receive input information from the input devices 620 to determine an offset angle value and an axis of rotation. In some embodiments, the rotation analysis circuit 610 is configured to provide adjustment information to the visualization circuit 612 that includes the determined offset angle value and an axis of rotation.

In some embodiments, the input information received from the input devices 620 corresponds to a user input providing an indication to virtually rotate a visualization about an axis. For example, in some embodiments it may be desirable to an operator to directly provide an indication relating to an offset angle value and an axis of rotation using one or more UI elements 22. The UI elements 22 can include buttons, knobs, a touch-screen interface, or any other device configured to receive a user input.

In some embodiments, the rotation analysis circuit 610 is configured to first process and/or analyze received input information to determine an axis of rotation and an offset angle value. For example, the input information received from the input devices 620 can relate to a horizontal displacement component value, vertical displacement component value, and/or a distance value of the display device 616 relative to the operator. The horizontal displacement component value can correspond to a horizontal position of the display relative to the operator. The vertical displacement component value can correspond to a vertical position of the display relative to the operator. The distance value of the display device 616 can correspond to a distance between the operator and the display device 616 and/or a point within the control center 10.

In some embodiments, the rotation analysis circuit 610 is configured to provide adjustment information to the visualization circuit 612. The adjustment information can relate to an axis of rotation and an offset angle value. In some embodiments, the rotation analysis circuit 610 is configured to determine two sets of adjustment information. The first set of adjustment information can relate to an axis of rotation corresponding to the x-axis, and the second set of adjustment information can relate to an axis of rotation corresponding to the y-axis.

In some embodiments, the offset angle generally relates to a number value of degrees or radians in which the visualization is virtually rotated about an axis. In some embodiments, the offset angle is expressed relative to the initial position of the visualization. For example, an offset angle value corresponding to ten degrees relates to increased rotation about an axis compared to an offset angle value corresponding to one degree. An offset angle value corresponding to ninety degrees relates to an even further increased rotation (i.e., in which the visualization is orthogonal to its initial position). An offset angle value corresponding to three hundred and sixty degrees relates to the visualization returning to its initial position.

Embodiments can use any suitable system to indicate the offset angle value. In an example embodiment, the offset angle value can be expressed as a positive number when the visualization is rotated in a particular direction about an axis and the offset angle value can be expressed as a negative number when the visualization is rotated in the opposite direction. For example, an offset angle value of five degrees and an offset angle value of negative three-hundred and fifty-five degrees relates to an identical or similar rotational position of the visualization. In other embodiments, the offset angle is expressed as a positive number. Referring to the preceding example, an offset angle value of negative five degrees can be expressed as three hundred and fifty-five degrees.

The memory 608 is shown to include a settings database 614. The settings database 614 can be configured to store information relating to received input information. For example, image processing circuit 604 may have received input information relating to a manual adjustment indicating an axis of rotation and an offset angle value. It may be desirable for the operator to store the axis of rotation and the offset angle value as a preset setting. The preset setting can be retrieved from the settings database 614 when system 600 is powered or begins a startup routine. In some embodiments, the image processing circuit 604 includes, stores, or is communicatively coupled to one or more databases, including the settings database 614.

The memory 608 is shown to include a visualization circuit 612. The visualization circuit 612 is generally configured to provide a visualization for displaying on a display screen of the display device 616. The visualization circuit 612 can be configured to provide the visualization as a plane corresponding to a pixel matrix with rows and columns. Each pixel in the pixel matrix can have a value corresponding to a color. The visualization circuit 612 can be configured to receive pixel data relating to the pixel matrix from the aircraft computing system 602.

The visualization circuit 612 can be configured to virtually rotate a visualization by modifying or manipulating a plurality of pixel values in the pixel matrix. In some embodiments, the visualization circuit 612 is configured to modify the plurality of pixels based on the adjustment information received from the rotation analysis circuit 610. In some embodiments, the visualization circuit 612 is configured to receive two sets of adjustment information. The first set of adjustment information can relate to an axis of rotation corresponding to the x-axis, and the second set of adjustment information can relate to an axis of rotation corresponding to the y-axis.

The visualization circuit 612 can be configured to modify or manipulate a plurality of pixel values in the pixel matrix to virtually rotate the visualization using any conventional or suitable image processing techniques. In some embodiments, the visualization circuit 612 can be configured to initially receive digital pixel data relating to the pixel matrix. The received pixel data can correspond to a pixel matrix that visually represents an unmodified visualization (e.g., the visualization 250 as shown with reference to FIG. 2). The visualization circuit 612 can be configured to receive the pixel data from one or more processing circuits, the input devices 620, the settings database 614, the aircraft computing system 602, etc. The visualization circuit 612 can be configured to manipulate or modify pixel color values of the received pixel matrix based on an offset angle value to render a rotated visualization. The visualization circuit 612 can be configured to output a pixel matrix corresponding to the rotated visualization, for example as described with reference to FIGS. 3-5. In some embodiments, the visualization circuit 612 outputs the rotated visualization for display on the display device 616.

Figure 7:
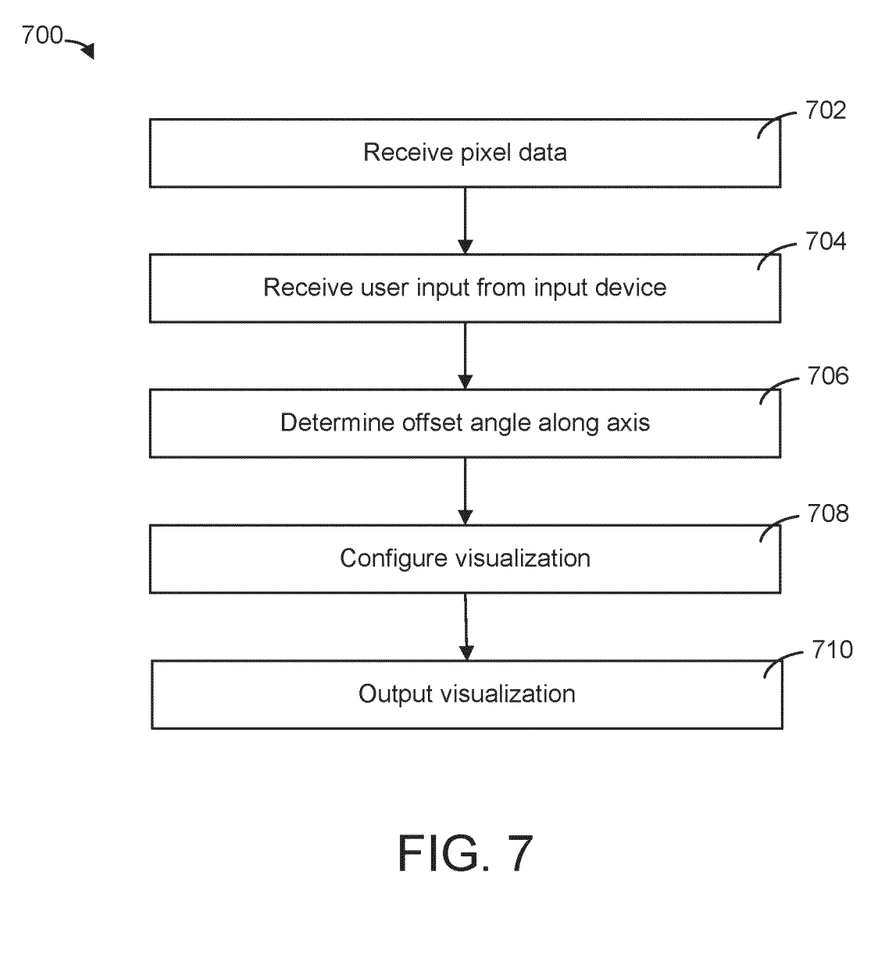
FIG. 7 is an exemplary embodiment of a process for generating a rotated visualization for display on an aircraft display screen, according to the inventive concepts disclosed herein.

Referring now to FIG. 7, a method 700 for generating a rotated visualization for display on an aircraft display screen is shown according to the inventive concepts disclosed herein. The method 700 may be performed using various hardware, apparatuses, and systems disclosed herein, such as the aircraft cockpit 100 and/or components or features of the display system 600. In some embodiments, one or more steps of method 700 can be performed by the rotation analysis circuit 610 and/or the visualization circuit 612. In some embodiments, method 700 is initiated when the image processing circuit 604 and/or the display device 616 is powered or initialized.

At step 702, the image processing circuit 604 receives pixel data. In some embodiments, the pixel data corresponds to a visualization (e.g., the visualization 250 as shown with reference to FIG. 2) provided as a pixel matrix for display on a display device (e.g. the display device 616). The pixel matrix may have columns and rows with each pixel in the pixel matrix having a value corresponding to a color.

The image processing circuit 604 can receive pixel data from various sources. For example, the image processing circuit 604 can receive pixel data from the aircraft computing system 602 or a graphics processing unit (GPU) configured to render a display output on the display device 616. The image processing circuit 604 can be communicably connected to the aircraft computing system 602 and/or the GPU to receive the pixel data. In other embodiments, the image processing circuit 604 can be provided with the aircraft computing system 602 and/or the GPU. In some embodiments, the pixel data can be received from the input devices 620. In some embodiments, the image processing circuit 604 receives the pixel data from the memory 608. For example, the image processing circuit 604 can receive a preset setting relating to the visualization from the settings database 614. The preset setting can relate to an axis of rotation and an offset angle value.

At step 704, the image processing circuit 604 receives input information from at least one input device. The input information can relate to a user input providing an indication to virtually rotate a visualization about an axis at an offset angle value. The input information can be received from the input devices 620 via a wired interface or a wireless interface. For example, the input information can be received from the UI elements 22. The UI elements 22 can include buttons, knobs, a touch-screen interface, or any other device configured to receive an indication from an operator relating to virtual rotation of the visualization about an axis at an offset angle value.

In some embodiments, the received input information corresponds to a horizontal displacement component value, a vertical displacement component value, and/or a distance value of the display device 616 relative to the operator. The horizontal displacement component value can correspond to a horizontal position of the display device 616 relative to the operator. The vertical displacement component value can correspond to a vertical position of the display device 616 relative to the operator. The distance value of the display device 616 can correspond to a distance between the operator and the display device 616 and/or the control center 10. In some embodiments, the input devices 620 are configured to automatically detect the horizontal displacement component value, the vertical displacement component value, and/or the distance value. The processing circuit 604 can receive the detected values as input information.

In some embodiments, input information is received from the eye detection system 622. The eye detection system 622 can be configured to detect a horizontal displacement component value, vertical displacement component value, and/or a distance value of the display device 616 relative to the operator. In some embodiments, the eye detection system 622 can include one or more cameras for detecting the horizontal displacement component value, the vertical displacement component value, and/or the distance value. For example, a camera can be configured to receive an image of the operator's head by placing the camera proximate to the control center 10 and positioning the camera such that its lens is pointed towards the headrest of a seat. The eye detection system 622 can be any of suitable type and/or configuration for detecting the horizontal displacement component value, the vertical displacement component value, and/or the distance value.

At step 706, the image processing circuit 604 determines an offset angle for adjusting the visualization. The offset angle generally relates to a number value of degrees or radians in which a visualization is virtually rotated about an axis. In some embodiments, the offset angle is expressed relative to an initial position of the visualization. For example, an offset angle value corresponding to ten degrees relates to increased rotation about an axis compared to an offset angle value corresponding to one degree. An offset angle value corresponding to ninety degrees relates to an even further increased rotation (i.e., in which the visualization is orthogonal to its initial position). An offset angle value corresponding to three hundred and sixty degrees relates to the visualization returning to its initial position. Embodiments can use any suitable system or unit of measurement to determine the offset angle value.

In some embodiments, the image processing circuit 604 determines the offset angle value in response to received input information at step 704. In some embodiments, the image processing circuit 604 determines an offset angle value by receiving an indication of an offset angle value, for example via UI elements 22 at step 704. In some embodiments, the image processing circuit 604 determines an offset angle value using one or more software modules.

For example, the image processing circuit 604 may use one or more software modules to determine an offset angle value in response to receiving input information from the eye detection system 622.

In some embodiments, the image processing circuit 604 determines the offset angle value through a series of calculations using a received horizontal displacement component value, a vertical displacement component value, and/or a distance value. In an example embodiment, the received horizontal displacement component may have a value identical to a distance value. The distance value may be a distance between the operator and a point within the control center 10 directly in front of the operator (e.g., an imaginary line formed between the operator and the control center 10 would be orthogonal to the control center 10). In this example, the image processing circuit 604 calculates an offset degree value to be forty-five degrees. In other embodiments, the distance value is measured between the operator and the display device 616.

At step 708, the image processing circuit 604 adjusts the visualization based on the determined offset angle. The image processing circuit 604 can adjust the visualization using any conventional or suitable image processing techniques. For example, the image processing circuit 604 can modify or manipulate a plurality of pixel values in the pixel matrix to render a rotated visualization. In some embodiments, step 706 may involve determining an offset value relating to both an x-axis and a y-axis. In this regard, step 708 can involve adjusting the visualization based on the x-axis offset angle value and adjusting the visualization based on the y-axis offset angle value.

At step 708, the image processing circuit 604 outputs the rotated visualization. The image processing circuit 604 can output a pixel matrix corresponding to the rotated visualization, for example as described with reference to FIGS. 3-5. In some embodiments, the image processing circuit 604 outputs the rotated visualization for display on the display device 616.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

What is claimed is:

1. A system for an airborne platform, comprising:
    a display device configured to display a visualization, the visualization provided as a pixel matrix capable of being virtually rotated along a horizontal axis or along a vertical axis based on a user input, the visualization being an entire screen area of the display device, the display device being mounted within the airborne platform;
    an input device configured to receive the user input from a user, the user input providing an indication to virtually rotate the visualization along at least one of the horizontal axis and the vertical axis, wherein the user input is for adjusting the visualization to account for the display device not directly facing the user and reduce parallax error associated with viewing the entire screen area; and
    an image processing circuit communicably coupled to the display device, the image processing circuit configured to:
        receive pixel data corresponding to the pixel matrix;
        receive the user input from the input device;
        determine an offset angle to virtually rotate the visualization along at least one of the horizontal axis and the vertical axis in response to the received user input;
        configure the visualization in response to the determined offset angle; and
        output the configured visualization for display on the display device;
    wherein virtual rotation of the visualization along at least one of the horizontal axis and the vertical axis simulates physical rotation of the display device to reduce the parallax error.

2. The system of claim 1, wherein the visualization is configured by modifying a color value of a plurality of pixels in the pixel matrix.

3. The system of claim 1, wherein the an indication is to virtually rotate the visualization along the horizontal axis and along the vertical axis.

4. The system of claim 1, wherein:
    the input device comprises a touch screen interface capable of receiving gestures of the user; and
    the user input is a touch gesture providing the indication to virtually rotate the visualization.

5. The system of claim 1, wherein:
    the input device comprises an eye detection system capable of determining at least one of a horizontal displacement component and a vertical displacement component as the user input; and
    the horizontal displacement component corresponds to an estimated horizontal distance between the user and the display device and the vertical displacement component corresponds to an estimated vertical distance between eyes of the user and the display device.

6. The system of claim 5, wherein:
    the eye detection system comprises a video camera capable of detecting at least one of the estimated horizontal distance of the user relative to the display device and the estimated vertical distance of the eyes of the user relative to the display device; and
    the eye detection system is configured to respectively determine the horizontal displacement component or the vertical displacement component in response to detecting the estimated horizontal distance or the estimated vertical distance.

7. The system of claim 1, wherein:
the system further comprises a settings database communicably coupled to the image processing circuit, the settings database configured to store a preset setting relating to an offset angle value; and
the image processing circuit is further configured to:
receive, from the settings database, the preset setting;
configure the visualization in response to the received preset setting; and
output the configured visualization for display on the display device.

8. An image processing circuit communicably coupled to a display device of an airborne platform, the display device configured to display a visualization provided as a pixel matrix on a display screen capable of being virtually rotated along a horizontal axis or along a vertical axis based on a user input and mounted at a location, the image processing circuit configured to:
receive pixel data corresponding to the pixel matrix for an entire area of the display screen;
receive the user input from an input device, the user input providing an indication to virtually rotate the visualization along at least one of the horizontal axis and the vertical axis;
determine an offset angle to virtually rotate the visualization along at least one of the horizontal axis and the vertical axis in response to the received user input;
configure the visualization in response to the determined offset angle; and
output the configured visualization for display on the display device;
wherein virtual rotation of the visualization along at least one of the horizontal axis and the vertical axis simulates physical rotation of the display device to reduce parallax error associated with the location and a user position.

9. The image processing circuit of claim 8, wherein the visualization is configured by modifying a color value of a plurality of pixels in the pixel matrix.

10. The image processing circuit of claim 8, wherein the user input from the user device provides an indication to virtually rotate the visualization along the horizontal axis and along the vertical axis.

11. The image processing circuit of claim 8, wherein:
the input device comprises a touch screen interface capable of receiving gestures of a user; and
the user input is a touch gesture providing the indication to virtually rotate the visualization.

12. The image processing circuit of claim 8, wherein:
the input device comprises an eye detection system capable of determining at least one of a horizontal displacement component and a vertical displacement component as the user input; and
the horizontal displacement component corresponds to an estimated horizontal distance between a user and the display device and the vertical displacement component corresponds to an estimated vertical distance between eyes of the user and the display device.

13. The image processing circuit of claim 12, wherein:
the eye detection system comprises a video camera capable of detecting at least one of the estimated horizontal distance of the user relative to the display device and the estimated vertical distance of the eyes of the user relative to the display device; and
the eye detection system is configured to respectively determine the horizontal displacement component or the vertical displacement component in response to detecting the estimated horizontal distance or the estimated vertical distance.

14. The image processing circuit of claim 8, wherein the image processing circuit is further configured to:
receive a preset setting relating to an offset angle value from a settings database communicably coupled to the image processing circuit and configured to store a plurality of preset settings;
configure the visualization in response to the received preset setting; and
output the configured visualization for display on the display device.

15. A method for virtually rotating a visualization displayed on a display device of an airborne platform, the visualization provided as a pixel matrix capable of being virtually rotated along a horizontal axis or along a vertical axis based on a user input, the method comprising:
receiving, by an image processing circuit, pixel data corresponding to the pixel matrix, the pixel matrix being for an entire screen area of the display device;
receiving, by the image processing circuit, the user input from an input device, the user input providing an indication to virtually rotate the visualization along at least one of the horizontal axis and the vertical axis;
determining, by the image processing circuit, an offset angle to virtually rotate the visualization along at least one of the horizontal axis and the vertical axis in response to the received user input;
configuring, by the image processing circuit, the visualization in response to the determined offset angle; and
outputting, by the image processing circuit, the configured visualization for display on the display device;
wherein virtual rotation of the visualization along at least one of the horizontal axis and the vertical axis simulates physical rotation of the display device to reduce parallax error wherein the virtual rotation accounts for the display device not directly facing a user.

16. The method of claim 15, wherein the visualization is configured by modifying a color value of a plurality of pixels in the pixel matrix.

17. The method of claim 15, wherein the indication is to virtually rotate the visualization along the horizontal axis and along the vertical axis.

18. The method of claim 15, wherein:
the input device comprises a touch screen interface capable of receiving gestures of the user; and
the user input is a touch gesture providing the indication to virtually rotate the visualization.

19. The method of claim 15, wherein:
the input device comprises an eye detection system capable of determining at least one of a horizontal displacement component and a vertical displacement component as the user input; and
the horizontal displacement component corresponds to an estimated horizontal distance between the user and the display device and the vertical displacement component corresponds to an estimated vertical distance between the eyes of the user and the display device.

20. The method of claim 19, wherein:
the eye detection system comprises a video camera capable of detecting at least one of the estimated horizontal distance of the user relative to the display device and the estimated vertical distance of the eyes of the user relative to the display device; and the eye detection system is configured to respectively determine the horizontal displacement component or the vertical displacement component in response to detecting the estimated horizontal distance or the estimated vertical distance.

\* \* \* \* \*